Aug. 27, 1968  F. MAYER ETAL  3,399,318
PERMANENT MAGNETIC ROTOR FOR ELECTRIC MACHINES, ESPECIALLY
SYNCHRONOUS MINIATURE MOTORS
Filed Oct. 4, 1965

INVENTORS
Franz MAYER
Alfred MEISNER

United States Patent Office 3,399,318
Patented Aug. 27, 1968

3,399,318
PERMANENT MAGNETIC ROTOR FOR
ELECTRIC MACHINES, ESPECIALLY
SYNCHRONOUS MINIATURE MOTORS
Franz Mayer and Alfred Meisner, Nurnberg, Germany,
assignors to Diehl, Nurnberg, Germany
Filed Oct. 4, 1965, Ser. No. 492,791
Claims priority, application Germany, Oct. 15, 1964,
D 45,639
6 Claims. (Cl. 310—156)

ABSTRACT OF THE DISCLOSURE

A permanent magnetic diametrically magnetized rotor for electric miniature motors, which includes a shaft and two substantially identical approximately semi-cylindrically contoured sections arranged on said shaft so as to form an image to each other while facing each other along a plane parallel to the longitudinal direction of said shaft, said rotor sections being of powdered magnetic material compressed in a direction perpendicular to the axis of rotation of said rotor with the lines of magnetic flux extending approximately in a direction perpendicular to the said plane, poles of uniform polarity of said two rotor sections being arranged symmetrically with regard to said plane whereby the magnetic lines of flux impacting upon each other in said plane are deviated radially outwardly to leave the said rotor in concentrated condition.

---

The present invention concerns a permanent magnetic rotor for electric machines, especially synchronous miniature motors, which consists of a material with preferred magnetic direction. Rotors of heretofore known synchronous miniature motors are generally pressed of powdered metal, and the preferred magnetic direction is determined by the direction in which the pressure acts upon the powdered metal. If the rotor is magnetized in its preferred magnetic direction, assuming the same magnetizing field intensity, it is well known that the remanence is considerably higher than when the magnetizing operation is effected in another direction.

It is an object of the present invention to provide a permanent magnetic rotor of the above mentioned type which has at least four poles, and in which the magnetic flux extends approximately in the preferred magnetic direction of the rotor material.

It is another object of this invention to provide a permanent magnetic rotor as set forth in the preceding paragraph which will make it possible to increase the magnetic induction over heretofore known permanent magnetic rotors to thereby improve the degree of efficiency of a motor equipped with a rotor according to the present invention.

These and other objects and advantages of the invention will appear more clearly from the following specification in connection with the accompanying drawing, in which.

The permanent magnetic rotor according to the present invention is characterized primarily in that the rotor is composed of at least two interconnected substantially equal parts the preferred magnetic direction of which extends substantially perpendicularly to the joint of said two parts which joined extends in axial direction of the rotor. The rotor according to the present invention is furthermore characterized in that the parts which make up the rotor and which are interconnected are so designed and are so magnetized in their preferred magnetic direction that the rotor will have at least four poles.

By taking advantage of the preferred magnetic direction of the material, it is possible to increase the magnetic induction and thus the degree of efficiency of the motor. In many instances, for instance when employing a motor equipped with a rotor according to the present invention and fed from a battery for driving a watch, the degree of efficiency is of foremost importance.

According to a further development of the invention, it is possible when at the joint, poles of the same polarity face each other, to insert between the two parts a plate of soft magnetic material which is cemented to the parts of the rotor and is adapted to bundle or concentrate the magnetic flux of those poles, which face each other at the joint and are of the same polarity, and to direct the flux outwardly.

Figure 1:
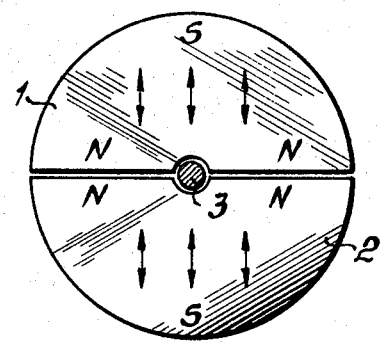
FIG. 1 is a top view of a four pole rotor according to the present invention.

Referring more specifically to the drawing, the rotor shown in FIG. 1 is composed of two sections 1 and 2 which are cemented to each other. Each part 1, 2 has semicircular recesses for receiving a shaft 3 which is likewise cemented to parts 1 and 2. As cement in this connection any suitable cement may be employed, as for instance epoxy resin.

Prior to assembling the rotor, the parts 1 and 2 are pressed of powdered metal, and the pressure is applied in the direction indicated by the arrows. The preferred magnetic direction of parts 1 and 2 coincides with the direction in which the pressure has been applied. In this direction parts or sections 1 and 2 are magnetized following the pressing operation. This magnetization is so effected according to FIG. 1 that on those sides which in assembled condition of sections 1 and 2 face each other there will be formed poles of the same polarity, in the particular showing of FIG. 1 north poles. Thus, at the other two sides there will be formed south poles. When sections 1 and 2 are cemented to each other, a four pole rotor will be obtained having one north pole each at the left and right hand side and having one south pole each at the top and at the bottom. The magnetic flux in the two sections 1 and 2 extends substantially in the direction of applied pressure, i.e. in the preferred magnetic direction of the material.

Figure 2:
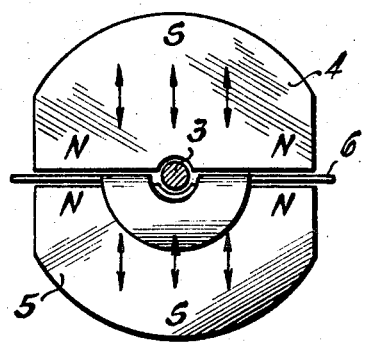
FIG. 2 is a rotor somewhat modified over that of FIG. 1 inasmuch as it is equipped with a plate for bundling or concentrating the magnetic flux.

The rotor of FIG. 2 is likewise composed of two parts, namely parts or sections 4 and 5 which prior to the assembly of the rotor are pressed in the direction illustrated by the arrows and are laterally cut off. Interposed between parts 4 and 5 is a plate 6 of soft magnetic material which is cemented to the parts 4 and 5. As will be seen from the drawing, plate 6 protrudes somewhat laterally and bundles or concentrates the magnetic flux of the two poles of the same polarity—north poles in the present instance—and directs said flux laterally outwardly.

Figure 3:
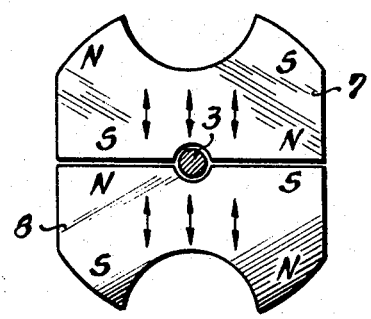
FIG. 3 shows a further modification of a four pole rotor according to the invention.

According to the embodiment of FIG. 3, the two sections 7 and 8 of the rotor have each two more pronounced poles. The sections 7 and 8 have been magnetized in the direction illustrated by the arrows so that each two succeeding poles of the rotor have opposite polarity.

Figure 4:
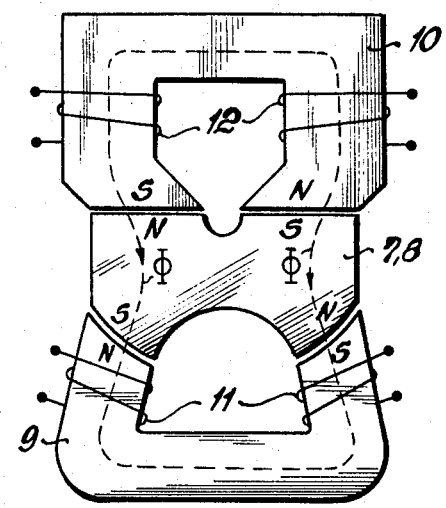
FIG. 4 illustrates a device for magnetizing the portions of the rotor according to FIG. 3.

The magnetization of sections 7 and 8 may be effected by means of the arrangement shown in FIG. 4. With this arrangement, sections 7 and 8 are passed through by the flux of two U-shaped cores 9, 10 which are provided with magnetizing windings 11, 12. Windings 11, 12 are so polarized that the sections 7 and 8 will respectively receive the indicated polarity. FIG. 4 shows that also with this embodiment the magnetic flux of sections 7 and 8 extends aproximately in the preferred magnetic direction (pressing direction) indicated in FIG. 3 by the arrows.

The rotor illustrated in FIG. 3 may with the same magnetic flux have a lower inertia movement than the rotors of FIGS. 1 and 2 and, therefore, is advantageously employed wherever a maximum flux at a minimum inertia moment is required.

Figure 5:
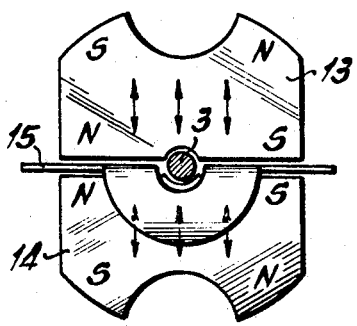
FIG. 5 represents a six pole rotor according to the invention which is likewise provided with an inserted plate similar to the rotor of FIG. 2.

The six pole rotor illustrated in FIG. 5 is likewise composed of two sections, namely the sections 13 and 14 which similar to the rotor of FIG. 3 have pronounced poles. Sections 13 and 14 are cemented to a plate 15 of soft magnetic material which protrudes laterally beyond the sections 13 and 14. In conformity with the illustrated polarity, those sides of sections 13 and 14 which face each other are of the same polarity so that the protruding ends of plate 15 form a north pole and a south pole respectively. Thus, each two succeeding poles of the six pole rotor of FIG. 5 have opposite polarity.

Also with the rotor according to FIG. 5 the magnetic flux extends substantially in the preferred magnetic direction of the material. The magnetization of sections 13 and 14 may be effected in a similar manner as that described in connection with FIG. 4.

Figure 6:
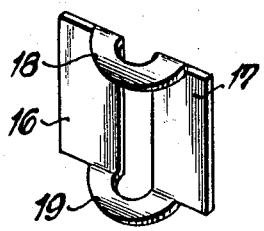
FIG. 6 is an isometric view of a plate for use in connection with a rotor according to FIGS. 2 and 5.

The plates 6 and 15 which are employed with the rotors of FIGS. 2 and 5 may have the shape which is illustrated in FIG. 6. Two sections 16 and 17 are at the top and at the bottom provided with two semicircular ears 18 and 19 which interconnect the plates 16 and 17. The ears 18 and 19 pass around shaft 3. The section 16 serves for bundling the magnetic flux of one polarity, for instance all north pole magnetic flux, whereas the section 17 bundles the magnetic flux of the other polarity, in the above-mentioned example, the south pole magnetic flux.

It is, of course, to be understood that the present invention is, by no means, limited to the particular constructions shown in the drawing but also comprises any modifications within the scope of the appended claims.

What we claim is:

1. A permanent magnetic diametrically magnetized rotor for electric miniature motors, especially synchronized miniature motors, which includes: a shaft, and two substantially identical approximately semi-cylindrically contoured rotor sections arranged on said shaft so as to form an image to each other while facing each other along a plane parallel to the longitudinal direction of said shaft, said rotor sections being of powdered magnetic material compressed in a direction perpendicular to the axis of rotation of said rotor with the lines of magnetic flux extending approximately in a direction perpendicular to the said plane, poles of uniform polarity of said two rotor sections being arranged symmetrically with regard to said plane, said sections being of sufficient axial extent so that the magnetic lines of flux impacting upon each other in said plane are deviated radially outwardly to leave the said rotor in concentrated condition.

2. A rotor according to claim 1, which includes magnetically conductive thin sheet metal plate means interposed between and connected to those adjacent sides of said two rotor sections which face each other.

3. A rotor according to claim 2, in which said sheet metal plate means are of soft magnetic material, and in which the outer rotor surface areas adjacent said sheet metal plate means extend substantially perpendicularly to said sheet metal plate means, the outer ends of said sheet metal plate means protruding beyond said outer rotor surface areas.

4. A rotor according to claim 2, in which said rotor sections are connected to each other.

5. A rotor according to claim 2, in which said rotor sections are cemented to said sheet metal plate means.

6. A rotor according to claim 2, in which said rotor sections are cemented to said shaft.

References Cited

UNITED STATES PATENTS

| 2,736,827 | 2/1956 | Buchmann | 310—156 |
| 2,774,896 | 12/1956 | Reynst et al. | 310—156 |
| 2,803,765 | 8/1957 | Timmerman | 310—156 |

MILTON O. HIRSHFIELD, *Primary Examiner.*

L. L. SMITH, *Assistant Examiner.*